US011622018B2

(12) United States Patent
Sweeney et al.

(10) Patent No.: US 11,622,018 B2
(45) Date of Patent: *Apr. 4, 2023

(54) OPTIMIZING MULTI-USER REQUESTS FOR A NETWORK-BASED SERVICE

(71) Applicant: Uber Technologies, Inc., San Francisco, CA (US)

(72) Inventors: Matthew Sweeney, San Francisco, CA (US); Logan Rockmore, Pittsburgh, PA (US); Lisa Weitekamp, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,739

(22) Filed: Sep. 16, 2021

(65) Prior Publication Data

US 2022/0006870 A1 Jan. 6, 2022

Related U.S. Application Data

(63) Continuation of application No. 16/736,589, filed on Jan. 7, 2020, now Pat. No. 11,153,395, which is a (Continued)

(51) Int. Cl.
*G06F 15/16* (2006.01)
*H04L 67/52* (2022.01)
(Continued)

(52) U.S. Cl.
CPC .............. *H04L 67/52* (2022.05); *H04L 65/40* (2013.01); *H04L 65/612* (2022.05); *H04L 67/306* (2013.01); *H04W 48/18* (2013.01)

(58) Field of Classification Search
CPC ....... H04L 67/52; H04L 65/612; H04L 65/40; H04L 67/306; H04W 48/18
(Continued)

(56) References Cited

U.S. PATENT DOCUMENTS 5,168,451 A 12/1992 Bolger
5,604,676 A 2/1997 Penzias
(Continued)

FOREIGN PATENT DOCUMENTS

CA 2889853 5/2014
CN 106651728 5/2017
(Continued)

OTHER PUBLICATIONS

Alfred Round, et al.: Future Ride: Adapting New Technologies to Paratransit in the United States, UC Transportation Center Berkeley, CA, UCTC No. 306 (1996).
(Continued)

*Primary Examiner* — Alan S Chou
(74) *Attorney, Agent, or Firm* — Mahamedi IP Law LLP

(57) ABSTRACT

A network system managing an on-demand service within a geographic region can receive, over a network, multi-user request data corresponding to a request for service for a plurality of users. The request data can indicate one or more start locations, a plurality of users, and one or more service locations. In response to receiving the request data, the network system can select a set of service providers from a plurality of candidate service providers in the geographic region to provide the requested service. The service providers can be selected based on optimizations of one or more service parameters including estimated fares for the plurality of users, ETAs to the start location, ETAs to the service locations, etc. The network system can further determine routes for the set of service providers from their respective locations to the start or service location(s) and from the start or service location(s) to the respective start or service location(s).

20 Claims, 6 Drawing Sheets

Related U.S. Application Data continuation of application No. 15/729,270, filed on Oct. 10, 2017, now Pat. No. 10,567,520.

(51) Int. Cl.
*H04L 67/306* (2022.01)
*H04L 65/40* (2022.01)
*H04W 48/18* (2009.01)
*H04L 65/612* (2022.01)

(58) Field of Classification Search
USPC ........................................................ 709/203
See application file for complete search history.

(56) References Cited

U.S. PATENT DOCUMENTS

| | | | |
|---|---|---|---|
| 5,945,919 | A | 8/1999 | Trask |
| 6,212,393 | B1 | 4/2001 | Suarez |
| 6,356,838 | B1 | 3/2002 | Paul |
| 6,587,782 | B1 | 7/2003 | Nocek et al. |
| 6,618,593 | B1 | 9/2003 | Drutman |
| 6,756,913 | B1 | 6/2004 | Ayed |
| 6,925,381 | B2 | 8/2005 | Adamcyzk |
| 6,950,745 | B2 | 9/2005 | Agnew |
| 6,989,765 | B2 | 1/2006 | Gueziec |
| 7,062,376 | B2 | 6/2006 | Oesterling |
| 7,080,019 | B1 | 7/2006 | Hurzeler |
| 7,353,034 | B2 | 4/2008 | Haney |
| 7,606,663 | B2 | 10/2009 | Neef |
| 7,610,145 | B2 | 10/2009 | Kantarjiev |
| 7,822,426 | B1 | 10/2010 | Wuersch |
| 7,886,019 | B2 * | 2/2011 | Srinivasachar ......... H04L 12/66 709/224 |
| 7,970,749 | B2 | 6/2011 | Uhlir |
| 8,140,256 | B1 | 3/2012 | dos-Santos |
| 8,285,571 | B2 | 10/2012 | Demirdjian |
| 8,362,894 | B2 | 1/2013 | Shah |
| 8,538,956 | B1 | 9/2013 | Szabadka |
| 8,554,608 | B1 | 10/2013 | O'Connor |
| 8,630,987 | B2 | 1/2014 | Dhuse |
| 8,775,070 | B1 | 7/2014 | Bhatia |
| 8,799,038 | B2 | 8/2014 | Chen et al. |
| 8,902,260 | B2 | 12/2014 | Kuhne |
| 9,244,147 | B1 | 1/2016 | Soundararajan |
| 9,483,744 | B2 | 11/2016 | Lord |
| 9,488,484 | B2 | 11/2016 | Lord |
| 9,552,559 | B2 | 1/2017 | Lord |
| 9,558,469 | B2 | 1/2017 | Lord |
| 9,569,740 | B2 | 2/2017 | Lord |
| 9,599,481 | B2 | 3/2017 | Lord |
| 9,631,933 | B1 | 4/2017 | Aula |
| 9,671,239 | B2 | 6/2017 | Lord |
| 9,689,694 | B2 | 6/2017 | Lord |
| 9,715,667 | B2 | 7/2017 | Lord |
| 10,082,793 | B1 | 9/2018 | Glaser |
| 10,203,212 | B2 | 2/2019 | Mazzella |
| 10,467,561 | B2 * | 11/2019 | Haparnas ......... G06Q 10/06311 |
| 11,153,395 | B2 * | 10/2021 | Sweeney ................ H04L 67/18 |
| 2001/0037174 | A1 | 11/2001 | Dickerson |
| 2001/0056363 | A1 | 12/2001 | Gantz |
| 2002/0054082 | A1 | 5/2002 | Karpf |
| 2003/0030666 | A1 | 2/2003 | Najmi |
| 2004/0024789 | A1 | 2/2004 | Ditcharo et al. |
| 2004/0049424 | A1 | 3/2004 | Murray |
| 2004/0107110 | A1 | 6/2004 | Gottlieb et al. |
| 2004/0158483 | A1 | 8/2004 | Lecouturier |
| 2005/0153707 | A1 | 7/2005 | Ledyard |
| 2006/0004590 | A1 | 1/2006 | Khoo |
| 2006/0034201 | A1 | 2/2006 | Umeda et al. |
| 2006/0059023 | A1 | 3/2006 | Mashinsky |
| 2006/0080188 | A1 | 4/2006 | Jung |
| 2006/0200306 | A1 | 9/2006 | Adamcyzk |
| 2006/0224437 | A1 | 10/2006 | Gupta |
| 2006/0242154 | A1 | 10/2006 | Rawat |
| 2007/0011324 | A1 | 1/2007 | Mehr |
| 2007/0038529 | A1 | 2/2007 | Jung |
| 2007/0150375 | A1 | 6/2007 | Yang |
| 2007/0255627 | A1 | 11/2007 | Hallowell |
| 2007/0276595 | A1 | 11/2007 | Lewinson |
| 2008/0014908 | A1 | 1/2008 | Vasant |
| 2008/0027772 | A1 | 1/2008 | Gernega |
| 2008/0055049 | A1 | 3/2008 | Weill |
| 2008/0091342 | A1 | 4/2008 | Assael |
| 2008/0195428 | A1 | 8/2008 | O'Sullivan |
| 2008/0270204 | A1 | 10/2008 | Poykko |
| 2008/0277183 | A1 | 11/2008 | Huang |
| 2009/0005963 | A1 | 1/2009 | Jarvinen |
| 2009/0113296 | A1 | 4/2009 | Lacy et al. |
| 2009/0143965 | A1 | 6/2009 | Chang et al. |
| 2009/0156241 | A1 | 6/2009 | Staffaroni et al. |
| 2009/0171939 | A1 | 7/2009 | Athsani |
| 2009/0176508 | A1 | 7/2009 | Lubeck et al. |
| 2009/0192851 | A1 | 7/2009 | Bishop |
| 2009/0216600 | A1 | 8/2009 | Hill |
| 2009/0222482 | A1 | 9/2009 | Klassen |
| 2009/0281844 | A1 | 11/2009 | Probst |
| 2009/0296990 | A1 | 12/2009 | Holland |
| 2009/0313077 | A1 | 12/2009 | Wheeler, IV |
| 2010/0042549 | A1 | 2/2010 | Adamcyzk |
| 2010/0070168 | A1 | 3/2010 | Sumcad |
| 2010/0205017 | A1 | 8/2010 | Sichelman et al. |
| 2010/0207812 | A1 | 8/2010 | Demirdjian |
| 2010/0223065 | A1 | 9/2010 | Jung |
| 2010/0253542 | A1 | 10/2010 | Seder |
| 2010/0292914 | A1 | 11/2010 | Vepsalinen |
| 2011/0000747 | A1 | 1/2011 | Wu |
| 2011/0009098 | A1 | 1/2011 | Kong |
| 2011/0052042 | A1 | 3/2011 | Ben Tzvi |
| 2011/0081919 | A1 | 4/2011 | Das et al. |
| 2011/0099040 | A1 | 4/2011 | Felt et al. |
| 2011/0118981 | A1 | 5/2011 | Chamlou |
| 2011/0145089 | A1 | 6/2011 | Khunger |
| 2011/0153629 | A1 | 6/2011 | Lehmann et al. |
| 2011/0225269 | A1 | 9/2011 | Yap et al. |
| 2011/0246246 | A1 | 10/2011 | Johnson |
| 2011/0301985 | A1 | 12/2011 | Camp et al. |
| 2011/0301997 | A1 | 12/2011 | Gale et al. |
| 2011/0320230 | A1 | 12/2011 | Podgumy |
| 2012/0041675 | A1 | 2/2012 | Juliver |
| 2012/0078671 | A1 | 3/2012 | Mohebbi |
| 2012/0078672 | A1 | 3/2012 | Mohebbi |
| 2012/0131170 | A1 | 5/2012 | Spat |
| 2012/0158445 | A1 | 6/2012 | Dufford |
| 2012/0203599 | A1 | 8/2012 | Choi |
| 2012/0232943 | A1 | 9/2012 | Myr |
| 2012/0233246 | A1 | 9/2012 | Guernez |
| 2012/0239452 | A1 | 9/2012 | Trivedi |
| 2012/0253548 | A1 | 10/2012 | Davidson |
| 2012/0290337 | A1 | 11/2012 | Helmy |
| 2013/0024249 | A1 | 1/2013 | Zohar |
| 2013/0054139 | A1 | 2/2013 | Bodin |
| 2013/0054281 | A1 | 2/2013 | Thakkar |
| 2013/0073327 | A1 | 3/2013 | Edelberg |
| 2013/0090963 | A1 | 4/2013 | Sharma |
| 2013/0096813 | A1 | 4/2013 | Geffner |
| 2013/0102333 | A1 | 4/2013 | Dam |
| 2013/0132140 | A1 | 5/2013 | Amin |
| 2013/0144831 | A1 | 6/2013 | Atlas |
| 2013/0174076 | A1 | 7/2013 | Geelen |
| 2013/0179215 | A1 | 7/2013 | Slinin |
| 2013/0196692 | A1 | 8/2013 | Huang |
| 2013/0218455 | A1 | 8/2013 | Clark |
| 2013/0226365 | A1 | 8/2013 | Brozovich |
| 2013/0232169 | A1 | 9/2013 | Gill et al. |
| 2013/0285855 | A1 | 10/2013 | Dupray |
| 2013/0295963 | A1 | 11/2013 | Sen |
| 2014/0011522 | A1 | 1/2014 | Lin |
| 2014/0012909 | A1 | 1/2014 | Sankar |
| 2014/0051465 | A1 | 2/2014 | Ruys et al. |
| 2014/0067488 | A1 | 3/2014 | James |
| 2014/0067901 | A1 | 3/2014 | Shaw |
| 2014/0082069 | A1 | 3/2014 | Varoglu et al. |
| 2014/0129135 | A1 | 5/2014 | Holden et al. |
| 2014/0129951 | A1 | 5/2014 | Amin |

(56) References Cited

U.S. PATENT DOCUMENTS

| | | |
|---|---|---|
| 2014/0156556 A1 | 6/2014 | Lavian |
| 2014/0172727 A1 | 6/2014 | Abhayanker |
| 2014/0173511 A1 | 6/2014 | Lehmann |
| 2014/0207375 A1 | 7/2014 | Lerenc |
| 2015/0324945 A1 | 1/2015 | Lord |
| 2015/0046080 A1 | 2/2015 | Wesselius |
| 2015/0055178 A1 | 2/2015 | Ishibashi |
| 2015/0073645 A1 | 3/2015 | Davidsson |
| 2015/0081581 A1 | 3/2015 | Gishen |
| 2015/0100238 A1 | 4/2015 | Cai |
| 2015/0154810 A1 | 6/2015 | Tew |
| 2015/0161554 A1 | 6/2015 | Sweeney |
| 2015/0161564 A1 | 6/2015 | Sweeney |
| 2015/0161752 A1 | 6/2015 | Barreto |
| 2015/0204684 A1 | 7/2015 | Rostamian |
| 2015/0248689 A1 | 9/2015 | Paul |
| 2015/0254581 A1 | 9/2015 | Brahme |
| 2015/0279217 A1 | 10/2015 | Chen |
| 2015/0323327 A1 | 11/2015 | Lord |
| 2015/0323329 A1 | 11/2015 | Lord |
| 2015/0323330 A1 | 11/2015 | Lord |
| 2015/0323331 A1 | 11/2015 | Lord |
| 2015/0323335 A1 | 11/2015 | Lord |
| 2015/0323336 A1 | 11/2015 | Lord |
| 2015/0324334 A1 | 11/2015 | Lord |
| 2015/0324717 A1 | 11/2015 | Lord |
| 2015/0324718 A1 | 11/2015 | Lord |
| 2015/0324729 A1 | 11/2015 | Lord |
| 2015/0324734 A1 | 11/2015 | Lord |
| 2015/0325128 A1 | 11/2015 | Lord |
| 2015/0339923 A1 | 11/2015 | Konig |
| 2015/0339928 A1 | 11/2015 | Ramanujam |
| 2015/0352128 A1 | 11/2015 | Villa et al. |
| 2015/0345951 A1 | 12/2015 | Dutta |
| 2015/0356803 A1 | 12/2015 | Ellis |
| 2016/0014561 A1 | 1/2016 | Inzer |
| 2016/0019496 A1 | 1/2016 | Gorlin |
| 2016/0019728 A1 | 1/2016 | Petrie |
| 2016/0026935 A1 | 1/2016 | Botea |
| 2016/0026936 A1 | 1/2016 | Richardson |
| 2016/0027306 A1 | 1/2016 | Lambert |
| 2016/0034828 A1 | 2/2016 | Sarawgi |
| 2016/0034845 A1 | 2/2016 | Hiyama |
| 2016/0117610 A1 | 4/2016 | Ikeda |
| 2016/0132792 A1 | 5/2016 | Rosnow |
| 2016/0138928 A1 | 5/2016 | Guo |
| 2016/0180346 A1 | 6/2016 | Cheng |
| 2016/0191637 A1 | 6/2016 | Memon |
| 2016/0231129 A1 | 8/2016 | Erez |
| 2016/0300318 A1 | 10/2016 | Godil |
| 2016/0301698 A1 | 10/2016 | Katara |
| 2016/0314511 A1 | 10/2016 | Jung |
| 2016/0321771 A1 | 11/2016 | Liu |
| 2016/0334232 A1 | 11/2016 | Zhuang |
| 2016/0363458 A1 | 12/2016 | Guo |
| 2016/0364678 A1 | 12/2016 | Cao |
| 2016/0364679 A1 | 12/2016 | Cao |
| 2016/0364823 A1 | 12/2016 | Cao |
| 2016/0364824 A1 | 12/2016 | Bryant |
| 2016/0370194 A1 | 12/2016 | Colijn |
| 2017/0011324 A1 | 1/2017 | Truong |
| 2017/0012920 A1 | 1/2017 | Chheda |
| 2017/0087915 A1 | 3/2017 | Guo |
| 2017/0115125 A1 | 4/2017 | Outwater |
| 2017/0138749 A1 | 5/2017 | Pan |
| 2017/0147959 A1 | 5/2017 | Sweeney |
| 2017/0169535 A1 | 6/2017 | Tolkin |
| 2017/0186126 A1 | 6/2017 | Marco |
| 2017/0191841 A1 | 7/2017 | Marueli |
| 2017/0191845 A1 | 7/2017 | Marueli |
| 2017/0193404 A1 | 7/2017 | Yoo |
| 2017/0200249 A1 | 7/2017 | Ullrich |
| 2017/0240098 A1 | 8/2017 | Sweeney |
| 2017/0255881 A1 | 9/2017 | Ritch |
| 2017/0270794 A1 | 9/2017 | Sweeney |
| 2017/0272901 A1 | 9/2017 | Sweeney |
| 2017/0300848 A1 | 10/2017 | Shoval |
| 2017/0308824 A1 | 10/2017 | Lord |
| 2018/0071634 A1 | 3/2018 | Carvallo |
| 2018/0081496 A1 | 3/2018 | Bhardwaj |
| 2018/0091603 A1 | 3/2018 | Nickels |
| 2018/0101925 A1 | 4/2018 | Brinig |
| 2018/0102017 A1 | 4/2018 | Brinig |
| 2018/0180426 A1 | 6/2018 | Pan |
| 2018/0268329 A1 | 9/2018 | Lord |
| 2018/0293521 A1* | 10/2018 | Akselrod ............ G06Q 10/025 |
| 2018/0306595 A1 | 10/2018 | Marueli |
| 2018/0315148 A1 | 11/2018 | Luo |
| 2018/0349825 A1 | 12/2018 | Yamamoto |
| 2018/0374350 A1 | 12/2018 | Sweeney |
| 2019/0035202 A1 | 1/2019 | Brinig |
| 2019/0095849 A1 | 3/2019 | Sweeney |
| 2019/0109910 A1 | 4/2019 | Sweeney |
| 2019/0149945 A1 | 5/2019 | Chheda |
| 2019/0172353 A1 | 6/2019 | Chen |
| 2019/0205812 A1 | 7/2019 | Afzal |
| 2019/0206009 A1 | 7/2019 | Gibson |
| 2019/0212157 A1 | 7/2019 | Wu |
| 2019/0221069 A1 | 7/2019 | Brinig |
| 2020/0005370 A1 | 1/2020 | Jung |
| 2020/0013020 A1 | 1/2020 | Yang |
| 2020/0128361 A1 | 4/2020 | Chheda |
| 2020/0145503 A1 | 5/2020 | Sweeney |
| 2020/0173979 A1 | 6/2020 | Nickels |
| 2020/0273337 A1 | 8/2020 | Sweeney |
| 2021/0010817 A1 | 1/2021 | Wu |
| 2021/0223051 A1* | 7/2021 | Hochberg .......... G01C 21/3461 |
| 2021/0227049 A1 | 7/2021 | Demilrap |
| 2021/0256794 A1 | 8/2021 | Brinig |
| 2021/0266703 A1 | 8/2021 | Chheda |
| 2021/0364302 A1 | 11/2021 | Nickels |

FOREIGN PATENT DOCUMENTS

| | | |
|---|---|---|
| CN | 111832788 | 10/2020 |
| EP | 2682868 | 1/2014 |
| EP | 2879410 | 6/2015 |
| EP | 3046058 | 7/2016 |
| JP | 2002-133592 | 5/2002 |
| JP | 2004-302941 | 10/2004 |
| JP | 2004-302942 | 10/2004 |
| JP | 2004-362271 | 12/2004 |
| JP | 2005-107942 | 4/2005 |
| JP | 2006-339810 | 12/2006 |
| JP | 3934985 | 6/2007 |
| JP | 2014-130552 | 6/2014 |
| JP | 2014-238831 | 12/2014 |
| JP | 2004-073639 | 5/2015 |
| KR | 10-2010-0035717 | 5/2010 |
| KR | 10-2014-0124137 | 10/2014 |
| KR | 10-2015-0045962 | 4/2015 |
| WO | WO 1999/044186 | 2/1999 |
| WO | WO 2005/013588 | 2/2005 |
| WO | WO 2011/067741 | 6/2011 |
| WO | WO 2011/069170 | 6/2011 |
| WO | WO 2011/120161 | 10/2011 |
| WO | WO 2011-120161 | 10/2011 |
| WO | WO 2014/106617 | 7/2014 |
| WO | WO 2017/079222 | 5/2017 |

OTHER PUBLICATIONS

Aloizio P. Silva, A Mobile Location-Based Vehicle Fleet Management Service Application, 0-7803-78482/03 2003, IEEE.

Andersson, Magnus, Peer-to-Peer Service Sharing Platforms: Driving Share and Share Alike on a Mass-Scale, Thirty Fourth International Conference on Information Systems, Milan 2013, pp. 1-15 (2013).

EESR in EP 17771000.1 dated Mar. 21, 2019.

EESR in EP 17859424.8 dated Aug. 5, 2019.

Exam Report No. 1 in AU 2015296265 dated Apr. 21, 2020.

Exam Report No. 1 in AU 2016293831 dated Aug. 28, 2019.

(56) References Cited

OTHER PUBLICATIONS

Exam Report No. 1 in AU 2017238067 dated Mar. 11, 2021.
Exam Report No. 2 in AU 2014362378 dated May 7, 2020.
Exam Report No. 2 in AU 2015296265 dated Aug. 13, 2020.
Exam Report No. 2 in AU 2017/342747 dated Aug. 27, 2019.
Examination Report No. 1 in AU 2014362378 dated Sep. 18, 2019.
Examination Report No. 1 in AU 2014362392 dated Sep. 10, 2019.
Examination Reported in AU 2017342747 dated Apr. 8, 2019.
Extended Search Report issued in EP 14869805.3 dated May 10, 2017.
Extended Search Report issued in EP 15826507.1 dated Nov. 10, 2017.
Fast and Clean, How to book two cabs at the same time in Uber, Jun. 30, 2017 (https://fastandclean.org/ book-two-cabs-time-uber).
First Examination Report in EP 14869806.3 dated May 4, 2018.
First Office Action in CN 2014800731753 dated Feb. 3, 2019.
Fu, et al., "On-Line and Off-Line Routing and Scheduling of Dial-a-Ride Paratransit Vehicles", Computer-Aided Civil and Infrastructure Engineering 14 (1999).
Hai Yang et al. "Equilibria of bilateral taxi-customer searching and meeting on networks", Transportation Research Part B., 2010, vol. 44, pp. 1067-1083.
How to request multiple Uber vehicles, Aug. 15, 2013 (https://www.wikihow.com/ Request-Multiple-Uber-Vehicles.
International Search Report and Written Opinion issued in PCT/US2016/062344 dated Jan. 31, 2017.
International Search report in PCT/US2016/016858 dated May 19, 2016.
International Search Report in PCT/US2015/034831 dated Sep. 24, 2015.
International Search Report in PCT/US2015/043654 dated Nov. 26, 2015.
International Search Report in PCT/US2017/053065 dated Dec. 13, 2017.
International Search Report issued in PCT/US2017/053065 dated Dec. 13, 2017.
IPRP in PCT/US2014/069602 dated Jun. 23, 2016.
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
ISR and Written Opinion dated Apr. 30, 2019 in PCT/US2019/012902.
ISR and Written Opinion in PCT/US2017/023343 dated Jul. 6, 2017.
ISR and Written Opinion in PCT/US2017/023350 dated Jun. 29, 2017.
ISR and Written Opinion in PCT/US2018/055256 dated Jan. 30, 2019.
ISR and Written Opinion in PCT/US2021/013677 dated Jun. 16, 2021.
Kikuchi, et al., "Advanced Traveler Aid Systems for Public Transportation", US Department of Transportation, Sep. 1994.
Office Action dated Apr. 16, 2020 in EP 1670690.0.
Office Action in BR 1120170017768 dated May 6, 2020.
Office Action in BR 1120180097799 dated Aug. 27, 2020.
Office Action in BR 1220200245654 dated Feb. 4, 2021.
Office Action in CA 2,932,828 dated Feb. 8, 2021.
Office Action in CA 2,956,631 dated May 7, 2021.
Office Action in EP 15826501.7 dated May 14, 2019.
Office Action in JP 2018-524399 dated Apr. 8, 2020.
Robert Kuhlthau and Ira D. Jacobson, The Development of a Model for Predicting Passenger Acceptance of Short Haul Air Transportation Systems, NASA, Sep. 1977.
Second Office Action dated Sep. 27, 2019 in CN 2014800731753.
Written Opinion in PCT/US2018/055256 dated Jul. 19, 2019.
Written Opinion issued in SG 11201700669R dated Dec. 5, 2017.
Xing Wang, Optimizing Ride Matches for Dynamic Ride Sharing Systems, GIT, May 2013.

* cited by examiner

OPTIMIZING MULTI-USER REQUESTS FOR A NETWORK-BASED SERVICE

CROSS-REFERENCE TO RELATED APPLICATION

This application is a continuation of U.S. patent application Ser. No. 16/736,589 filed Jan. 7, 2020, which is a continuation of U.S. patent application Ser. No. 15/729,270 filed on Oct. 10, 2017, now U.S. Pat. No. 10,567,520; the aforementioned priority applications being hereby incorporated by reference in their entireties.

BACKGROUND

A conventional on-demand network service can connect a requesting user with an available service provider to fulfill a service request of the requesting user. In response to a service request from the requesting user, a service provider can be selected to fulfill the service request. Typically, each requesting user submits a separate and unique service request requesting the on-demand service. In response to a particular service request for a particular user, the network system can identify and select a service provider to provide the requested service for the particular user. When a group of users need to request service, each user of the group of users individually and separately submit a respective service request to the network system.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
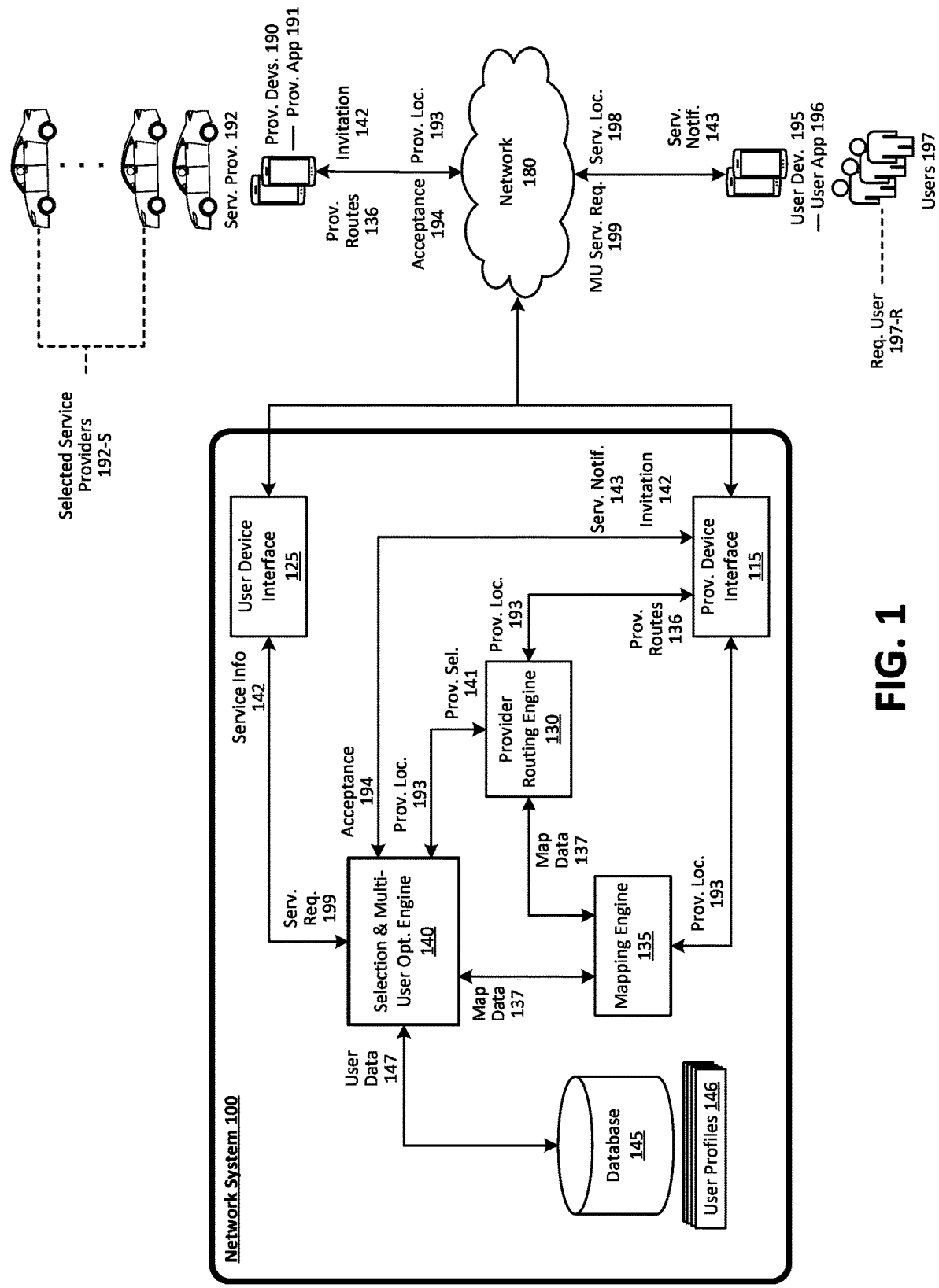
FIG. 1 is a block diagram illustrating an example network system in communication with user devices and provider devices to manage an on-demand network service, as described herein.

A network system is provided herein that manages a network service (e.g., a transport service, a delivery service, etc.) linking available service providers (e.g., drivers and/or autonomous vehicles (AVs)) with requesting users (e.g., riders, service requesters) throughout a given region (e.g., a metroplex such as the San Francisco Bay Area). In doing so, the network system can receive request data corresponding to requests for service from computing devices of requesting users via a designated user application executing on the users' mobile computing devices ("user devices"). Based on a start location (e.g., a location where the user rendezvouses with a selected service provider) determined from a user input or from one or more geo-aware resources on the user device, the network system can identify candidate service providers and transmit invitations to devices of one or more of the candidate service providers to fulfill the service request to a service location (e.g., a location where the requested service is completed such as a drop-off location where the service provider drops off the user).

Existing systems that manage network services can only receive service requests for single users. In other words, a single user's data or profile associated with the service is utilized or accessed for each service request. Because of such limitations, multiple users wishing to utilize the service as a group must transmit separate service requests to existing network systems—one for each user. As such, existing network systems must expend network resources to receive and transmit data relating to the multiple service requests and must perform the service provider selection process multiple times. In addition, because a single-user service provider selection process is only optimized for the corresponding user, the resulting service being provided to the group of users can be far from optimal for one or more of the users. For instance, one user from the group may be required to wait for the arrival of a corresponding service provider at a start location for substantially longer than other users of the group. As another example, the network system cannot optimize the service provider selection and navigation route generation processes by selecting a service provider to provide services for two or more of the users.

In contrast, according to embodiments, the network system can fulfill a multi-user service request requesting service for multiple users. In doing so, the network system performs a number of functions such as monitoring respective locations and availabilities of available service providers, selecting an optimal set of service providers to fulfill the multi-user service request, and generating routes for the each of the service providers to the start locations and service locations associated with the multi-user service request. In the context of an on-demand transport service, the multi-user service request can correspond to a request for transport for a plurality of users from a start location (e.g., an event venue, a restaurant, a bar, etc.) to the users' respective service locations (e.g., the users' homes). The service request can also correspond to a request for transport for the plurality of users from their respective start locations (e.g., the users' current locations, the users' homes, etc.) to a service location (e.g., an event venue, a restaurant, a bar, etc.). In various implementations, to facilitate the multi-user service request being fulfilled by service providers, the network system can select one or more service providers and determine routes for the selected service providers by optimizing one or more service parameters, such as estimated fares, wait times (e.g., ETA of service providers to the start location), travel times, times of arrival, etc., for the plurality of users. Various conditions associated with or contemporaneous with the requested service—such as traffic conditions, the start and service location(s) of the service request, availability of service providers in the vicinity of the start location(s)—can affect the one or more service parameters. In addition, various attributes associated with service providers—such as the providers' locations, capacities, provider classes—can also affect the one or more service parameters. By optimizing the one or more service parameters, the network system can select a set of service providers that achieve or approximate an optimal selection of service providers in the given circumstances in response to the multi-user service request. The considered service parameters may be customizable to the preferences of one or more users or may be determined based on the geographic region serviced by the network system. For example, the requesting user may identify the service parameters to be considered as part of service request. In addition or as an alternative, a first geographic region (e.g., San Francisco metro area) may have different service parameter considerations as compared with a second geographic region (e.g., New York City metro area). As a result, the network system is able facilitate the fulfillment of the multi-user request for service by selecting appropriate service providers (e.g., based on the optimization of the one or more service parameters) from any one of a plurality of provider classes for the plurality of users.

As used herein, the terms "optimal," "optimize," or variants thereof are intended to mean an act of achieving, through deliberate consideration, a result or outcome that is advantageous with respect to particular facets or parameters of one or more systems or processes. The use of such terms in reference to a given process does not necessarily mean that a result or outcome achieved is the most desirable or ideal, but rather can mean the result or outcome is more desirable with respect to particular facets or parameters as compared to an alternative process or a process that is performed without deliberate consideration for the particular facets or parameters.

In addition, as used herein, the terms "user," "customer," or variants thereof are intended to mean an individual having a profile or an account with a network service. Users can interact with the network service over a network via a user application executing on a mobile computing device or via a web interface. The user can, for instance, request services, obtain information regarding requested services, etc. by interacting with user interfaces within the user application or using the web interface. As used herein, a single user or a customer can refer to a plurality of individuals receiving the requested service. For example, a single user can request on-demand transport services for three persons (e.g., the single user and two travel companions, three persons other than the single user, etc.). A user of a service request refers to a user whose account or profile with the network service is being utilized (e.g., accessed for information, billed or charged, etc.) for the requested service. Furthermore, as used herein, a "multi-user request" is intended to mean a request for service for a plurality of users, each of the plurality of users' profiles or accounts with the network service being utilized for the requested service.

Among other benefits, the network system described herein improve the operation and efficiency in managing the on-demand network service compared with conventional approaches. For instance, by receiving and processing multi-user service requests rather than a plurality of separate service requests transmitted over the network, network bandwidth can be more efficiently utilized and network performance can be improved. Furthermore, the network system can perform a single optimization process to select a set of optimal service providers in response to a multi-user service request. In comparison, for a conventional network service requiring a plurality of service requests for a plurality of users, multiple separate optimization processes need to be performed, one for each of the plurality of users. In addition, the results of the optimization process (e.g., service providers selected, routes generated, etc.) are more optimally suited for the plurality of users than otherwise possible by the users submitting individual service requests. In one aspect, the optimization and selection process performed by an exemplary networking system in response to a multi-user request for service can seek to minimize estimated wait times, fares, and/or travel times for the collective plurality of users (or a subset thereof) indicated by the request by selecting service providers having the appropriate capacity, provider class, and/or location. As a result, the collective wait times, fares, and/or service times for the collective plurality of users can be minimized. In addition, the network system can optimize the selection of service providers and/or the routing of the selected service providers such that two or more of the plurality of users are serviced by the same service provider. For instance, in response to a multi-user service request, the network system, based on the optimization and selection process, can determine that, based on contemporaneous conditions, it is desirable to group two or more users of the plurality of users such that they can be serviced by a single service provider. In response, the network system can determine to select a service provider capable of providing service to the two or more users (e.g., based on capacity of the service provider, etc.). The resulting service provider selection can be desirable because, for example, it achieves an optimal tradeoff between ETA and estimated fares. Such a service provider selection would not be possible in response to a plurality of single-user service requests. Furthermore, because many conditions (e.g., traffic conditions, locations of service providers, availability of service providers, etc.) and variables can affect the optimal selection of service providers, often in conflicting manners that require tradeoffs between them, users or administrators of the network service cannot feasibly perform such optimizations mentally or manually. In particular, because these conditions and variables change rapidly in real-time, even if users were capable of mental or manual optimizations, the results of such optimizations would be obsolete by the time they were achieved.

According to embodiments, the network system can receive, over a network, multi-user request data corresponding to a multi-user service request for a plurality of users. The request data can indicate location information (e.g., one or more start locations, one or more service locations, etc.) and information regarding the plurality of users (e.g., identification information such as a username, email address, phone number, etc.). In one embodiment, the multi-user request data can indicate a start location (e.g., an event venue, a restaurant, a bar, etc.) and respective service locations for each of the plurality users (e.g., each user's home address, etc.). In another embodiment, the multi-user request data can indicate respective start locations for each of the plurality of users (e.g., each user's home or work address, etc.) and a service location (e.g., an event venue, a restaurant, a bar, etc.). In response to receiving the request data, the network system can select, from a plurality of candidate service providers, a set of service providers to fulfill the requested service for the plurality of users.

In various aspects, each service provider can be associated with a provider class. In certain contexts, a provider class can indicate or is reflective of a capacity of the service provider. For example, in the context of an on-demand transport service, a service provider can be associated with an extra-capacity provider class indicating that the service provider is capable of transporting additional passengers compared to another service provider associated with a default provider class. In certain context, a provider class can indicate a class of service of the service provider. Also in the context of an on-demand transport service, a first provider class can indicate that a corresponding service provider provides luxury transport service (e.g., service provider operates a luxury vehicle, etc.); a second provider class can indicate that a corresponding service provider operates an economy transport service; and a third provider class can indicate that a corresponding service provider provides a rideshare service.

According to embodiments, the network system can select the set of service providers from a plurality of service providers associated with different provider classes based on, at least in part, optimization of one or more service parameters. Such service parameters can include estimated fares, waiting times, estimated times of arrival, etc. In some embodiments, the network system can perform multi-variate optimizations to optimize two or more service parameters. In doing so, the network system can select a set of service providers that offer an optimal trade-off between multiple service parameters. In one implementation, the network system performs a multi-variate optimization to optimize the estimated fares and the estimated times of arrival by selecting appropriate service providers (e.g., based on their respective locations, capacities, provider classes, etc.) for the plurality of users. By performing the selection and optimization processes, the network system can select optimal service providers to service the multi-user service request from a plurality of candidate service providers of various provider classes. The selected set of service providers include service providers of two or more provider classes. As part of the selection and optimization process, the network system can select, for each users of the plurality of users, a corresponding service provider. In some instances, a service provider can be selected to provide services to two or more users of the plurality of users.

As part of the optimization and selection process, the network system can compute the one or more service parameters for each of the plurality of users. For instance, one such service parameter can be the estimated fares for the plurality of users and the network system can compute an estimated fare for each of the users based, at least in part, on each user's respective start and service locations. Another such service parameter can be estimated times of arrival of the plurality of users at the service location(s) and the network system can compute an estimated time of arrival at the service location(s) for each of the users. In certain implementations, optimizing a service parameter can be based on optimizing the aggregate sum of the respective estimated values for the service parameter for each user of the plurality of users. For instance, the network system can select a set of service providers that minimizes the aggregate amount of time the plurality of users have to wait for a service provider to arrive at the start location(s) or ETA to the service location(s). In other implementations, the optimization and selection process can be based on optimizing the mean or median of the service parameters for the plurality of users. For example, the network system can select a set of service providers that minimizes the mean or median estimated fare for the plurality of users. Still further, the optimization and selection process can be based on optimizing maximum, minimum, or outlier values of the service parameters among the plurality of users. As an example, the network system can select the set of service providers that reduces the maximum ETA to the service location(s) among the plurality of users.

The network system can determine a plurality of potential service provider selections in response to receiving the multi-user service request. Each of the potential service provider selections can represent a different combination of available service providers that can be selected by the network system to fulfill the multi-user service request. The network system can compute or estimate service parameters associated with each of the plurality of potential service provider selections. An optimization score can be computed for each service potential service provider selection based on its associated service parameters. Such an optimization score can represent or be a result of multi-variate optimizations of the service parameters. Based on the optimization score, a set of service providers can be selected from among the plurality of potential service provider selections.

According to embodiments, the network system can generate a first set of routes from the service providers' respective locations to the start location (or to a plurality of start locations) and a second set of routes from the start location (or from a plurality of start locations) to the respective service locations of the plurality of users. In situations where the multi-user data indicates a start location and a plurality of service locations, the network system can generate a first set of routes from the service providers' respective locations to the start location and a second set of routes from the start location to each of the plurality service locations. Similarly, where the multi-user data indicates a plurality of start locations and a service location, the network system can generate a first set of routes from the service providers' respective locations to the start locations and a second set of routes from the start locations to the service location. Route data corresponding to the first and second set of routes can be transmitted to provider devices of the selected service providers. In response to receiving the route data, a provider device of a selected service provider can display the routes generated by the network system for the service provider within a provider application executing on the provider device.

As described herein, the network system can receive location information from provider devices to monitor current, up-to-date locations and availabilities of service providers in the given region managed by the network system in order to perform the optimization and selection process to select the set of service providers in response to a multi-user request for service. Because the locations and availabilities of service providers are constantly changing, the network system can perform the selection and optimization process in a timely manner in order to ensure that the results of the selection process reflect up-do-date locations and availabilities of the service providers in the given region. The network system can maintain one or more databases to store the up-to-date locations and statuses of the service providers in order to quickly query such information in selecting service providers. As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user devices and provider devices to manage an on-demand network service, as described herein. The network system 100 can manage a network service that connects users 197 with service providers 192 that are available to fulfill the users' requests. The network service can provide a platform that enables on-demand services (e.g., a transportation service, a ride-sharing service, a delivery service, etc.) between users 197 and available service providers 192 by way of a user application 196 executing on the user devices 195, and a provider application 191 executing on the provider devices 190. As used herein, a user device 195 and a provider device 190 can comprise a computing device with functionality to execute a designated application corresponding to the network service managed by the network system 100. In many examples, the user device 195 and the provider device 190 can comprise mobile computing devices, such as smart-phones, tablet computers, VR or AR headsets, on-board computing systems of vehicles, smart watches, and the like.

According to embodiments, the network system 100 can include a user device interface 125 to communicate with user devices 195 over one or more networks 180 to receive service requests. A requesting user 197-R wishing to utilize the network service can launch the user application 196 to cause his or her user device 195 to transmit a request over the network 180 to the network system 100. The requesting user 197-R can be prompted, in a user interface of the user application 196, to select between requesting services for a single user (e.g., for the requesting user 197-R or another individual) or for a plurality of users. For a single-user request, the requesting user 197-R can enter or select a start location and/or a destination location. For a multi-user request, the requesting user 197-R can be prompted to input one or more start locations and/or one or more service locations. For example, the requesting user 197-R can select to enter a start location and a plurality of service locations (e.g., from a restaurant, a venue, a bar, etc. to the users' homes). The requesting user 197-R can also select to enter a plurality of start locations and a service location (e.g., from the users' current locations to a restaurant, a venue, a bar, etc.). In some cases, the start location(s) or service location(s) of a multi-user service request 199 can be indicated by location data (e.g., GPS data, GLONASS data, etc.) received from the requesting user's device 195. In addition, the requesting user 197-R can also be prompted to enter information relating to the plurality of users 197 for whom service is being requested, such as phone numbers, email address, account names, etc. The requesting user 197-R can be prompted to select one or more of the plurality of users 197 from a list of individuals (e.g., a contact list, a favorite list of users, etc.) displayed on the user device 195 of the requesting user 197-R. The requesting user 197-R can also manually enter information (e.g., phone number, email address, etc.) relating to one or more of the plurality of users 197. The requesting user 197-R can complete the request and cause the user device 195 of the requesting user 197-R to transmit a multi-user request 199 to the network system 100. The multi-user request 199 can include information such as the start location(s), service location(s), and/or information relating to the plurality of users 197.

According to embodiments, the network system 100 can monitor locations of the users 197 to enable the requesting user 197-R to select nearby users as users 197 of the multi-user service request 199. In an example, as part of a process to generate a multi-user request 199 for service for a plurality of users from a start location to a plurality of service locations, the user device 195 of the requesting user 197 can transmit a query to the network system 100 for a list of users located near the requesting user's current location. The network system 100 can transmit data to the user device 195 of the requesting user 197-R to cause the user device 195 to display a list of nearby users. The requesting user 197-R can then select one or more of the nearby users as users 197 to be serviced by the multi-user service request 199. In this manner, the process to input information relating to the users 197 can be expedited and streamlined. In certain examples, the network system 100 can limit the displayed nearby users to those who are on a contact list of the requesting user 197-R or who have previously given consent to be included in such a displayed list of nearby users.

In some instances, instead of prompting the requesting user 197-R to enter the start location(s) and/or the service location(s), the plurality of users 197 can be individually prompted to enter the start location(s) and/or the service location(s). In response to receiving the multi-user service request 199, the network system 100 can, using the information relating to the users 197 in the multi-user request 199, query a database 145 storing user profiles 146 to retrieve user data 147 pertaining to the plurality of users 197. The user data 147 can contain information (e.g., network tokens, connection data, etc.) to allow the network system 100 to transmit service notifications 143 to the user devices 195 operated by the plurality of users 197. The service notifications 143 can cause the user devices 195 of the plurality of users 197 to display one or more prompts for the users 197 to individually enter or select start location(s) and/or service location(s).

For example, the requesting user 197-R can request services for a plurality of users (including the requesting user 197-R) from a start location to a plurality of service locations. To do so, the requesting user 197-R can, via the user application 196, cause a multi-user service request 199 to be transmitted to the network system 100. The multi-user service request 199 can indicate the start location (e.g., current location of the requesting user 197-R) and identification information of the plurality of users 197. The multi-user service request 199 can further indicate a service location for the requesting user 197-R. The network system 100, in response to receiving the multi-user service request 199, can retrieve user data 147 from database 145 and to transmit service notifications to the user devices 195 of the plurality of users 197 (other than the requesting user 197-R) using the retrieved user data 147. In response to the service notifications 143, the users 197 can input (e.g., enter an address, select on a map, select from a frequently visited or favorited location, etc.) via the user application 196 respective service locations 198. The respective service locations 198 can be transmitted from the user devices 195 to the network system 100. In a similar fashion, for a multi-user service request 199 requesting services from a plurality of start locations to a service location, the plurality of users 197 can individually enter their respective start locations. This manner of distributed input of service details relating to the multi-user service request 199 among the user devices 195 operated by the requesting user 197-R and the other users 197 has multiple benefits. For instance, by allowing each user to individually enter respective service or start locations via his or her user device 195, information such as the users' home or work locations can be kept private. In addition, because the users 197 are entering start or service locations on their respective user devices 195, location information stored on the user devices 195 (e.g., within content storage of the user application 196) or on the database 145 maintained by the network system 100 can be leveraged to allow easy entry of location information. For instance, a user 197 can quickly select a favorited location (e.g., a home address, a work address, etc.) stored within content storage of the user application 196 executing on the user's device 195 or within the user's profile data 146 stored on the database 145.

In various examples, in response to receiving the multi-user service request 199, a selection and multi-user optimization engine 140 can select a set of service providers 192-S from a plurality of candidate service providers 192 to fulfill the multi-user service request 199. The selection and multi-user optimization engine 140 can select the set of service providers 192-S based on optimizing one or more service parameters for the plurality of users 197 to select the set of service providers 192-S. The service parameters can include estimated fares, wait times (e.g., ETA of service providers to the start location), travel times, estimated times of arrival, etc., for the plurality of users. In one aspect, the selection and multi-user optimization engine 140 can select the set of service providers 192-S from a plurality of candidate service providers associated with a plurality of provider classes. As a result, the set of service providers 192-S selected to fulfill a multi-user service request 199 can comprise service providers associated with two or more provider classes. In addition, the network system 100 can perform multivariate optimizations of two or more service parameters to select the set of service providers 192-S. To perform the optimizations, the network system 100 can perform one or more heuristic functions to minimize or maximize two or more service parameters. For example, the selection and multi-user optimization engine 140 can perform a heuristic function to minimize both the estimated fares for the plurality of users and the estimated times of arrival at the service location(s).

The selection and multi-user optimization engine 140 can further determine an appropriate tradeoff between two or more of the service parameters. In certain situations, such as where the closest available service providers to the start location are of a luxury provider class, a selection of these closes available service providers may minimize estimated arrival time at the service locations but may result in undesirably high estimated fares for the plurality of users 197. As a result, the network system can determine, based on optimizing the one or more service parameters (e.g., estimated fares and estimated times of arrival at the service locations), to select more economical service providers (e.g., of an economy provider class, etc.) that are further away that may result in a slightly longer estimated time of arrival but drastically reduces the estimated fares for the plurality of users 197. Or, depending on the conditions, the selection and multi-user optimization engine 140 can determine to select one or more service providers associated with the luxury provider class in conjunction with one or more service providers associated with the economy provider class, which can yield a more optimal tradeoff between the one or more service parameters. As another example, in response to a multi-user service request 199 requesting service from a start location to a plurality of service locations, a first user can have a service location that is nearby to the service location of a second user. Or, the service location of the first user can be located along a route from the start location to the second service location. Depending on the particular circumstances (e.g., availability and capacities of nearby service providers, the service locations, etc.), it may be desirable to select the set of service providers 192-S such that the first user and the second user are serviced by the same service provider. Thus, the selection and multi-user optimization engine 140 can determine to select a single service provider to service both the first and second user based on optimizing estimated fares for the first and second users and the estimated times of arrival for the first and second users. For instance, under certain circumstances, the selection and multi-user optimization engine 140 can determine that the selection of a single service provider for the first and second users will result in an excessively long estimated time of arrival for the first and second users because no service provider with the required capacity to service both the first and second users is available. In such a situation, the selection and multi-user optimization engine 140 can determine to select different service providers for the first and second users. In some instances, the selection and multi-user optimization engine 140 can perform simulations to compute the one or more service parameters for each permutation of potential service provider selection 141. The selection and multi-user optimization engine 140 can then optimize the one or more service parameters by choosing the service provider selection 141 that yields the most desirable results.

In one implementation, the selection and multi-user optimization engine 140 can determine the selection of service providers based on optimizing the ETAs of the users at a location such that the ETAs of the users fall within a time window. For example, the network system 100 can receive a multi-user service request 199 indicating a plurality of start locations and a service location. The network system 100 can determine the selection of service providers such that each of the users 197 is estimated to arrive at the service location within a certain time window. The time window can be entered as an input by the requesting user 197-R or another user 197.

In addition, the network system 100 can receive information from provider devices 190 via a provider device interface 115 to monitor the locations and availabilities of the service providers. For example, the network system 100 can receive up-to-date provider locations 193 (e.g., GPS data, GLONASS data, etc.) to monitor current locations of the service providers 192. In addition, the network system 100 can receive up-to-date status information indicating the availability of the service providers 192. The network system 100 can utilize the received information in selecting the set of service providers 192-S. For instance, in selecting the set of service providers 192-S, network system 100 can ignore from consideration service providers 192 that are unavailable (e.g., servicing another request) or are located beyond a predetermined distance or ETA from the start location(s). The network system 100 can further take into consideration the direction of travel of the service providers 192 or their current destinations. For instance, if the network system 100 determines that a service provider 192 is currently en-route to a destination located within a certain predetermined distance from the start location, the network system 100 can determine to include the service provider 192 in the selection and optimization process in selecting the set of service providers 192-S.

Once service providers 192-S have been selected, the selection and multi-user optimization engine 140 can generate provider invitations 142 to each of the set of service providers 192-S. Upon receiving the provider invitations 142, the selected service providers 192-S can accept or decline the provider invitations 142 via the service provider application 191 executing on the provider devices 190. By interacting with a user interface to accept or decline the invitation 142, a selected service provider 192-S can cause his or her provider device 190 to transmit an acceptance 194 to the network system indicating that the invitation 142 has been accepted. In the event any of the selected service providers 192-S declines his or her respective invitation 142, the selection and multi-user optimization engine 140 can select an alternate service provider from the candidate service providers. The alternate service provider can be selected based on similarities or equivalencies with respect to one or more characteristics (e.g., current location, ETA to start location, provider class, capacity, etc.) as the selected service provider 192-S who elected to decline the invitation. In addition, the selection and multi-user optimization engine 140 can re-perform the optimization and selection process to select optimal providers in response to a selected service provider rejecting an invitation.

In some aspects, the network system 100 can include a mapping engine 135, or can utilize a third-party mapping service, to generate map data 137 and/or traffic data in the environment surrounding the start location. The mapping engine 135 can receive the service provider locations 193 and input them onto the map data 137. The map data 137 can be utilized by the selection and multi-user optimization engine 140 to select service providers in response to receiving a multi-user service request 199. In addition, the mapping engine 135 can generate provider routes 136, including turn-by-turn directions, for transmission to provider devices operated by the service providers 192-S selected to fulfill the multi-user service request 199. The provider routes 136 can include a first set of routes from the current locations of the service providers 192-S to the start location(s) and a second set of routes from the start location(s) to the service location(s).

For example, in response to a multi-user request 199 requesting service for a plurality of users 197 from a start location to a plurality of service locations, the mapping engine 135 can generate a first set of routes from respective current locations of the selected service providers 192-S to the start location, with each of the first set of routes being generated for a respective one of the selected service providers 192-S. Provider routes 136 corresponding to the first set of routes can then be transmitted to the provider devices 190 of the selected service providers 192-S. The mapping engine 135 can further generate a second set of routes from the start location to respective service locations. The network system 100 can transmit the provider routes 136 such that a given service provider 192-S only receives routes generated for him or her (i.e., route from the given service provider's location to the start location or route from the start location to service locations of users being serviced by the given service provider).

In various implementations, the user profiles 146 stored on the database 145 can include historical information specific to the individual users 197 of the on-demand network service. Such information can include user preferences of service types, routine routes, start locations, and service locations, work addresses, home addresses, addresses of frequently used service locations (e.g., a gym, grocery store, mall, local airport, sports arena or stadium, concert venue, local parks, and the like).

According to embodiments, the selection and multi-user optimization engine 140 (or another component of the network system 100) can monitor the progress of the service being provided for the plurality of users 197 by the selected service providers 192-S. Service progress information can be transmitted from the network system 100 to the user devices 195 in the form of service notifications 143. Service progress information transmitted to a user 197 can include an estimated time of arrival of a service provider 192-S (e.g., service provider selected to provide service to the user 197) at a start location, an estimated time of arrival of the user 197 at the service location, etc. The service progress information can be displayed within the user application 196 in the form of a trip progress bar, a map, a notification, and the like.

Still further, the network system 100 can transmit trip progress information of a given user to one or more other users of the multi-user service request 199. The network system 100 can monitor events such as a rendezvous by the given user with a service provider selected to provide service for the given user, an arrival of the given user at his or her service location, etc. to transmit trip progress of the given user to one or more other users. The network system 100 can do so based on monitoring the given user's location or the location of a service provider selected to provide services for the given user or based on receiving a notification from the provider device indicating that the service provider has completed the requested service for the given user. The network system 100 can further determine events to monitor based on characteristics of the multi-user service request 199 such as whether the multi-user service request 199 requests service to a plurality of service locations or whether the multi-user service request 199 requests service from a plurality of start locations. Such determinations may be made by the network system 100 because certain events may have more significance than others depending on the characteristics of the multi-user request 199. For example, for a multi-user service request 199 requesting services for users 197 from a start location to respective service locations of the users, the network system 100 can determine whether or not to monitor for arrival of each of the users 197 at their respective service locations to notify the others of the users 197. In this fashion, one or more of the users 197 can be notified when other users have arrived at their service locations. As another example, for a multi-user service request 199 requesting services for users 197 from a plurality of start locations to a service location, the network system 100 can determine whether or not to monitor for rendezvous of each of the users 197 with their respective service providers and for arrival of each of the users at the service location. This automated way of informing users of the service progress information of other users of multi-user service request 199 can be particularly helpful for users to stay apprised of other users' service progress.

According to another aspect, the network system 100 can separately determine fares for services rendered for each of the users 197. The determination of the fare for a given user can be based, at least in part, on the distance and/or time associated with the service provider's provision of services for the given user. The network system 100 can be configured to determine split fares for two or more users serviced by the same service provider. The network system 100 can be configured to split a fare evenly among the two or more users. The network system 100 can also be configured to split the fare in a manner that is reflective of the distances traveled and/or time spent by the service provider for each of the two or more users. Subsequent to determining the fares for the given user, the network system 100 can cause a payment method stored in the given user's user profile 146 to be charged for the fare determined for the given user.

Methodology

Figure 2:
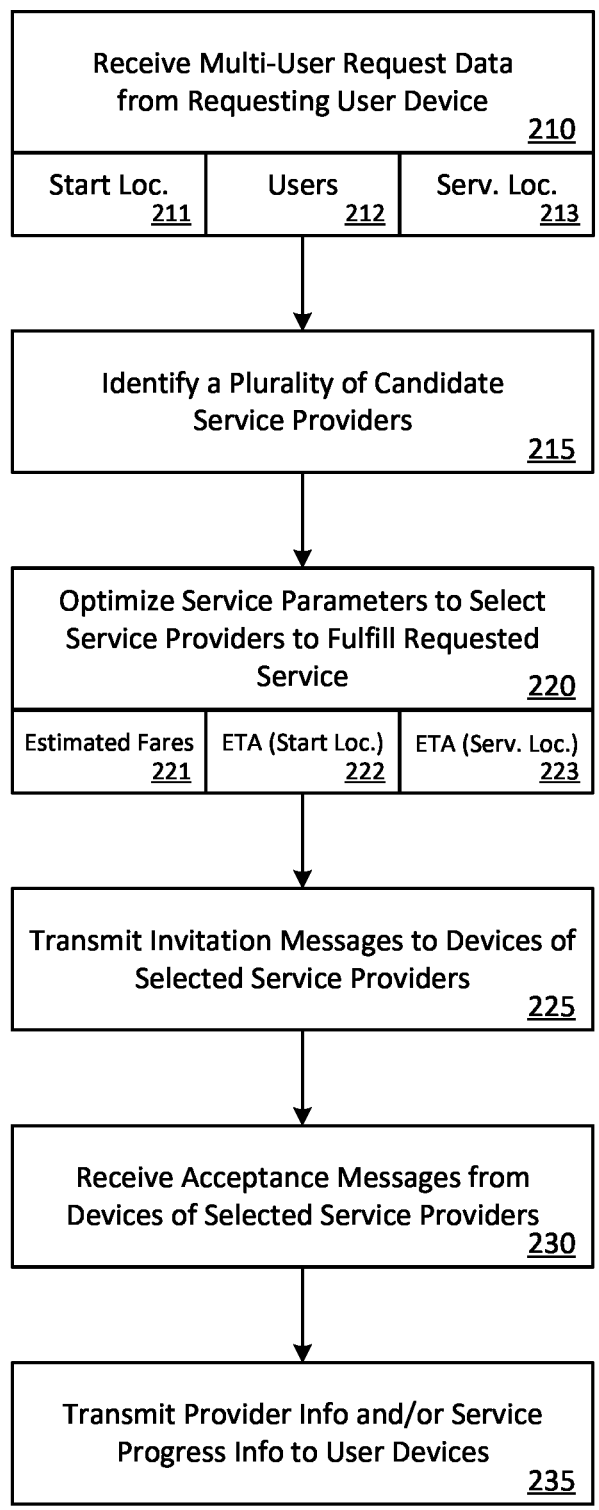
FIG. 2 is a flow chart describing an example method of managing an on-demand network service in response to a multi-user request for service, in accordance with examples described herein.

FIG. 2 is a flow chart describing an example method of managing an on-demand network service in response to a multi-user request for service, in accordance with examples described herein. In the below discussion of FIG. 2, reference may be made to features and examples shown and described with respect to FIG. 1. For instance, the example method illustrated in FIG. 2 can be performed by the exemplary network system 100 of FIG. 1.

Referring to FIG. 2, the network system 100 can receive multi-user request data corresponding to a multi-user request from a requesting user device (210). The multi-user request data can indicate one or more start locations (211) and/or one or more service location(s) (213). In addition, the multi-user request data can include information relating to the users to be serviced by the multi-user service request (212). An example method to generate the multi-user request is illustrated in and described with respect to FIG. 3.

In response to receiving the multi-user request data, the network system can identify a plurality of candidate service providers (215). The candidate service providers can be identified based on their respective locations and availabilities. The network system 100 can monitor the locations and availabilities of service providers by periodically or continuously receiving location data (e.g., data from GPS, GLONASS, or other location-aware resource) and status information from provider devices operated by the service providers. For example, the network system 100 can identify for consideration service providers who are located within a predetermined distance from the start location(s) and are available (e.g., available to fulfill a service request). In addition, the network system 100 can selectively identify a service provider who is contemporaneously providing services to a location near the start location(s) of the multi-user service request, even though that service provider would otherwise be determined to be unavailable.

The network system 100 can further optimize one or more service parameters to select a set of service providers from the plurality of candidate service providers to fulfill the requested service for the plurality of users (220). The service parameters can include estimated fares for the plurality of users (221), ETAs of the service providers to the start location(s) (e.g., wait times for the users at the start location) (222), and ETAs to the service location(s) (e.g., wait times for the users at the start location plus travel time from the start location(s) to the service location(s)). In certain implementations, as part of the optimizations of the one or more service parameters, the network system can identify a plurality of potential service provider selections from the plurality of candidate service providers and compute or estimate corresponding service parameters (e.g., estimated fares for the users 221, wait times for users at the start location 222, ETA to the service location 223, etc.) for each of the plurality of potential service provider selections. The network system can subsequently select one of the plurality of potential service provider selections as the set of service providers to fulfill the multi-user request for service based on the service parameters computed or estimated for the potential service provider selections. The network system can select the potential service provider selection having the most optimal set of service parameters as the selected set of service providers to fulfill the multi-user service request. For instance, the network system can weigh the service parameters or evaluate multivariate functions (e.g., Hessian matrices) of the service parameters to determine which of the potential service provider selections to select. In addition, the network system can generate or compute an optimization score for each of the potential service provider selections based on the service parameters estimated for the potential service provider selections. And the set of service providers to fulfill the multi-user request can be selected based on the respective optimization scores. For instance, the potential service provider selection having the most desirable optimization score (e.g., representing the most optimal trade-off between the estimated service parameters) can be selected to fulfill the multi-user service request.

After selecting the set of service providers, the network system 100 can transmit invitations messages to provider devices of the selected service providers (225). In response to receiving an invitation message, a provider device executing a provider application can display a user interface to allow the selected service provider to accept or decline the invitation. In response to an "Accept" selection within the provider application, the provider device can transmit an acceptance message to the network system 100 indicating that the invitation has been accepted by the service provider. After receiving the acceptance messages from devices of the selected service providers (230), the network system can transmit provider information (e.g., identification information) to user devices of the plurality of users associated with the multi-user service request (235).

The network system can further generate service progress information for transmission to user devices of the plurality of users. For instance, for a given user, the network system can generate and transmit information related to estimated time of arrival at the start location of the service provider selected to provide service for the given user. In addition, after the given user has rendezvoused with the selected service provider at the start location, the network system can generate estimated time of arrival at the service location for the given user. In response to receiving such service progress information, the user device operated by the given user can display, within the user application, interfaces to graphically or textually display such information. For instance, the user device can display a map showing a current progress of the service provider to the start location or a map showing a current progress along the route to the service location. In addition, the user device can display ETA information and/or one or more service progress bars indicating the progress of the requested service. In addition, the network system can generate, for the selected service providers, routes from their respective current locations to the start location(s) and routes from the start location(s) to the service location(s).

Figure 3:
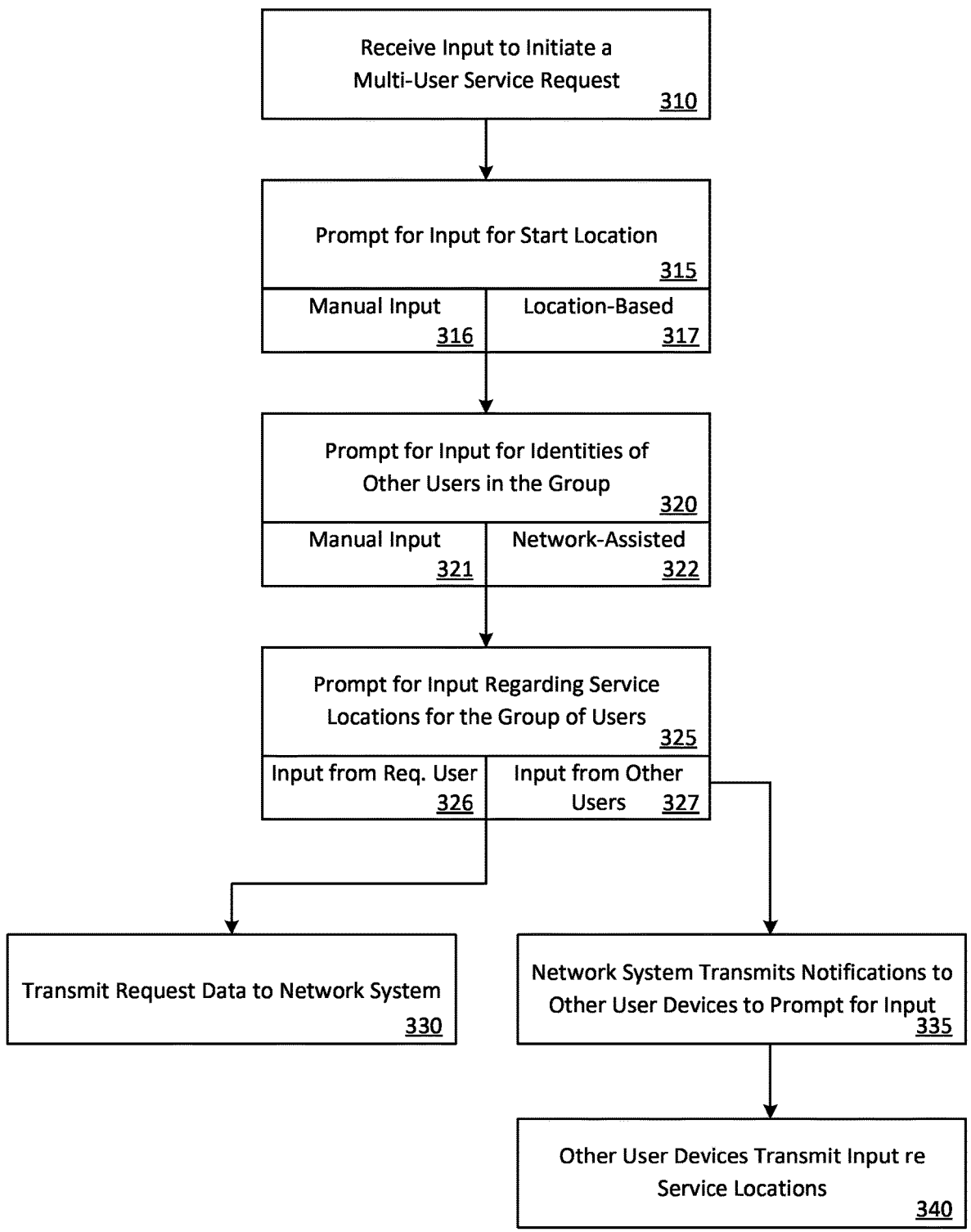
FIG. 3 is a flow chart describing an example method of generating and transmitting, to a network system, a multi-user request for service, as described herein, as described herein.

FIG. 3 is a flow chart describing an example method of generating and transmitting, to a network system, a multi-user request for service from a start location to a plurality of service locations, as described herein. In the below discussion of FIG. 2, reference may be made to FIG. 1. For instance, the example method illustrated in FIG. 3 can be performed by the exemplary user device 195 in conjunction with the exemplary networks system 100 of FIG. 1.

Referring to FIG. 3, the user device can receive, via the user application executing on the user device, an input to initiate a multi-user service request (310). The user application can then prompt for the requesting user to input a start location (315). The start location can be manually input via the user application by the requesting user (316). The start location can also be location-based and set as the current location of the requesting user (317). In other instances, where the requesting user requests a multi-user service from a plurality of start locations to a service location, the network system can allow the requesting user to enter the plurality of service locations or prompt the plurality of users to input their respective start locations.

The user device can also prompt the requesting user to enter the identification information, such as email addresses, phone numbers, account names, etc., of the users to be serviced by the multi-user service request (320). The requesting user can enter this information manually (321). The input of the user information can also be network-assisted (e.g., assisted by information provided by the network system) (322). For instance, the user device can transmit a query to the network system for information regarding users located nearby to the requesting user's current location. The user device can, using the information returned by the network system, display a list of nearby users of the network service that the user can select as the users associated with the multi-user service request. In addition, the user device can display contact lists, favorited list of users, etc., to allow the requesting user to quickly enter information regarding the other users associated with the multi-user service request.

The network system can prompt input regarding the users' respective service locations (325). The requesting user can input one or more of the service locations (326). Thereafter, the user device of the requesting user can transmit request data corresponding to the multi-user service request to the network system (330).

In addition or as an alternative, users can individually enter service locations using their respective user devices (327). For instance, the network system can transmit notifications (e.g., push notifications, notifications displayed within the user application, etc.) to the devices of the other users to prompt for input regarding their respective service locations (335). In response, the other users associated with the multi-user service request can individually enter their respective service locations (340).

Hardware Diagram

Figure 4:
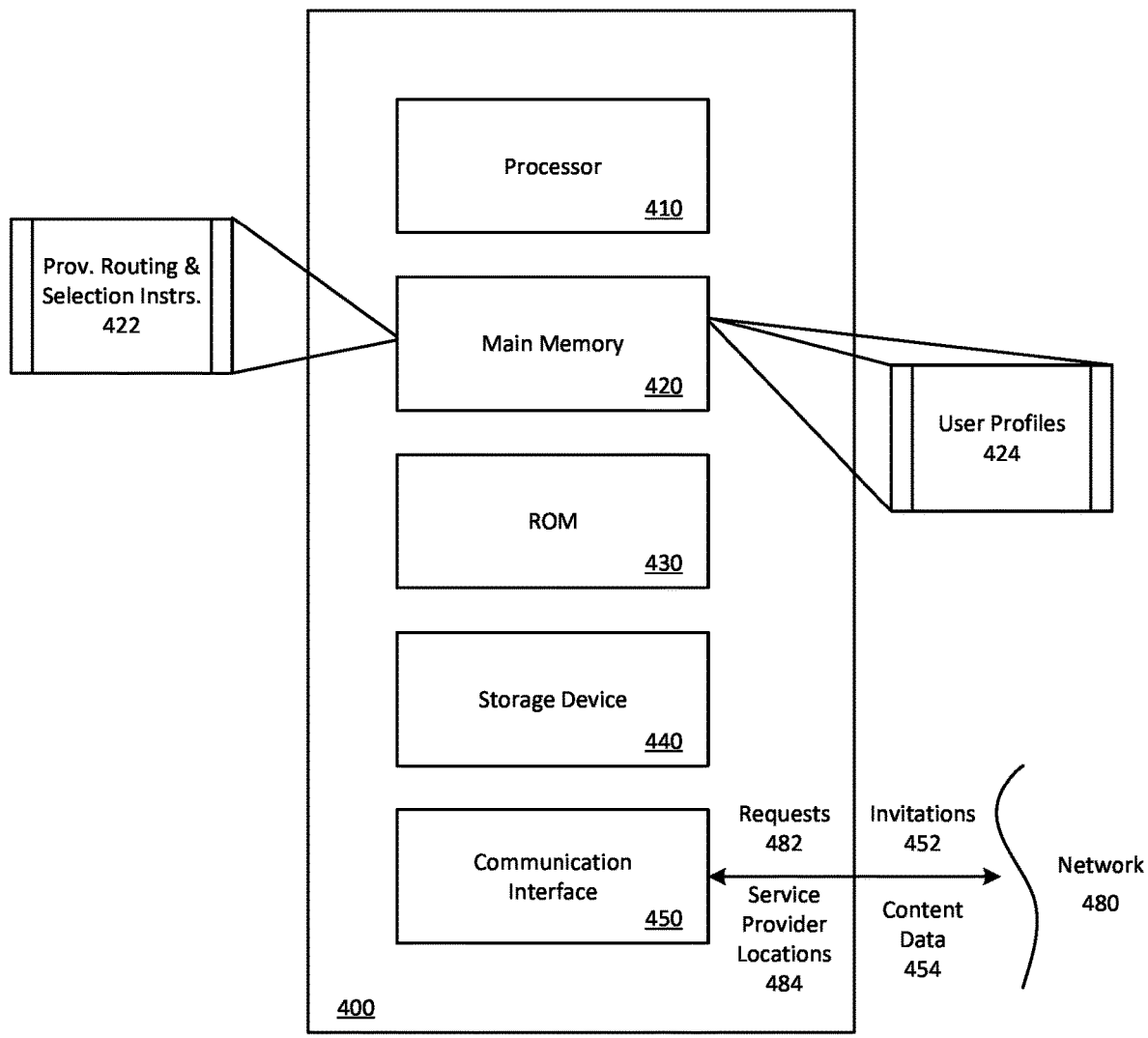
FIG. 4 is a block diagram illustrating a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of a network service, such as described in FIGS. 1 through 3. In the context of FIG. 1, the network system 100 may be implemented using a computer system 400 such as described by FIG. 4. The network system 100 and may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network) through use of the network link (wireless or wired). Using the network link, the computer system 400 can communicate with one or more computing devices, one or more servers, one or more databases, and/or one or more self-driving vehicles. In accordance with examples, the computer system 400 receives requests 482 from mobile computing devices of individual users. The executable instructions stored in the memory 430 can include provider routing and selection instructions 422, which the processor 410 executes to perform optimizations of one or more service parameters to select a set of service providers in response to a multi-user service request 482 and to determine routes for the selected service provider(s).

The executable instructions stored in the memory 420 can also include content generation instructions 424, which enable the computer system 400 to access user profiles 424 and other user information in order to select and/or generate user content 454 for display on the user devices. By way of example, the instructions and data stored in the memory 420 can be executed by the processor 410 to implement an example network system 100 of FIG. 1. In performing the operations, the processor 410 can receive requests 482 and service provider locations 484, and submit invitation messages 452 to facilitate the servicing of the requests 482. The processor 410 is configured with software and/or other logic to perform one or more processes, steps and other functions described with implementations, such as described by FIGS. 1 to 4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
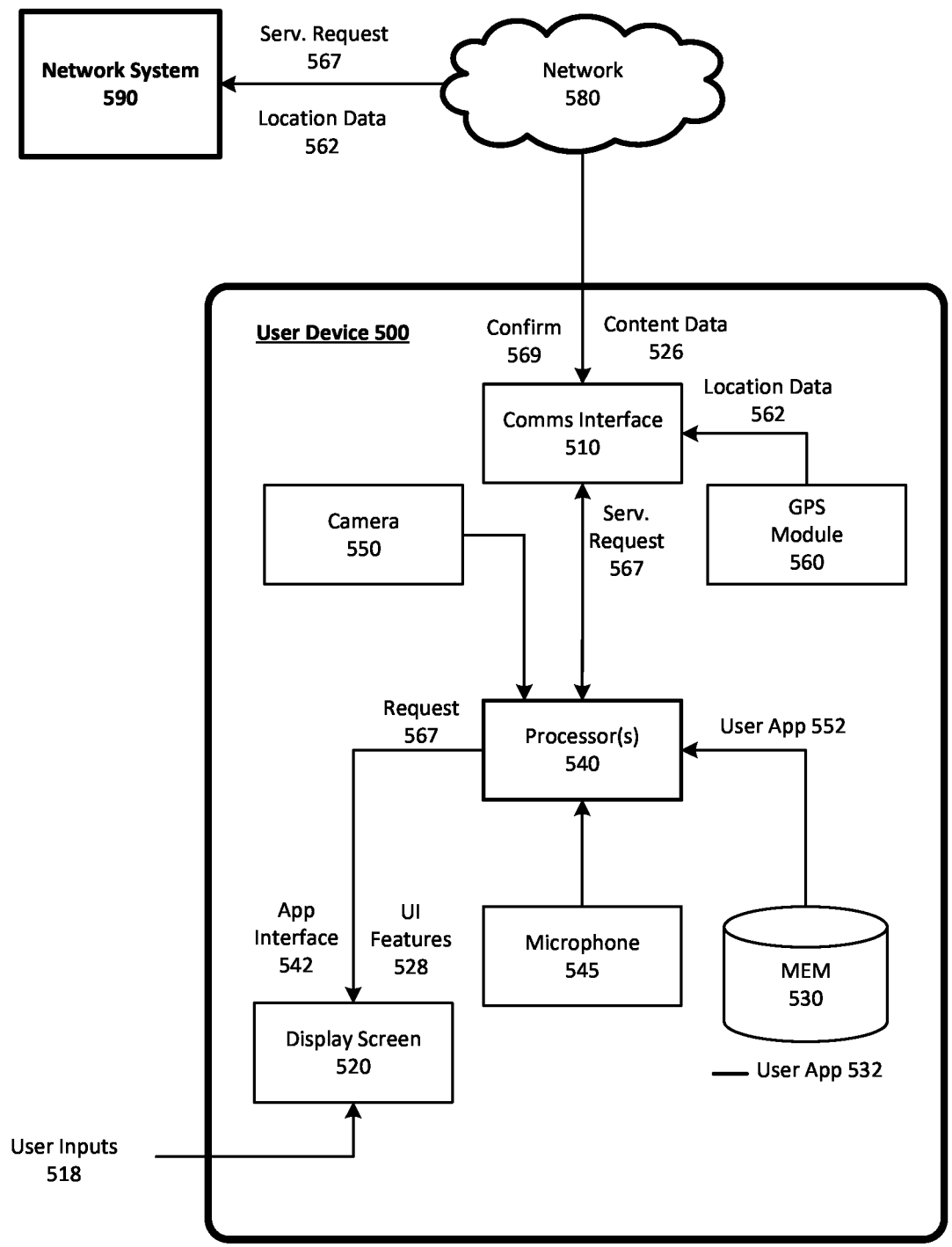
FIG. 5 is a block diagram illustrating an example user device executing a designated user application for a network service, as described herein.

FIG. 5 is a block diagram illustrating an example user device executing and operating a designated user application for communicating with a network service, according to examples described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, enter a multi-user request for service. In various implementations, the app interface 542 can further enable the user to enter or select one or more start locations and/or one or more service locations (e.g., by entering an address, performing a search, or selecting on an interactive map). Furthermore, the app interface 542 can display dynamically information relating to the requested service. The user can generate a request 567 via user inputs 518 provided on the app interface 542. The request 567 can be a request for service for a plurality of users (e.g., multi-user service request 199 of FIG. 1).

As provided herein, the user application 532 can further enable a communication link with a network system 590 over the network 580, such as the network system 100 as shown and described with respect to FIG. 1. The processor 540 can generate user interface features 528 (e.g., map, request status, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the requests 567 via a communications interface 510 to the backend network system 590 over a network 580. In response, the user device 500 can receive a confirmation 569 from the network system 590 indicating the selected service provider that will service the request 567. In various examples, the user device 500 can further include a GPS module 560, which can provide location data 562 indicating the current location of the requesting user to the network system 590 to, for example, establish the service location.

Provider Device

Figure 6:
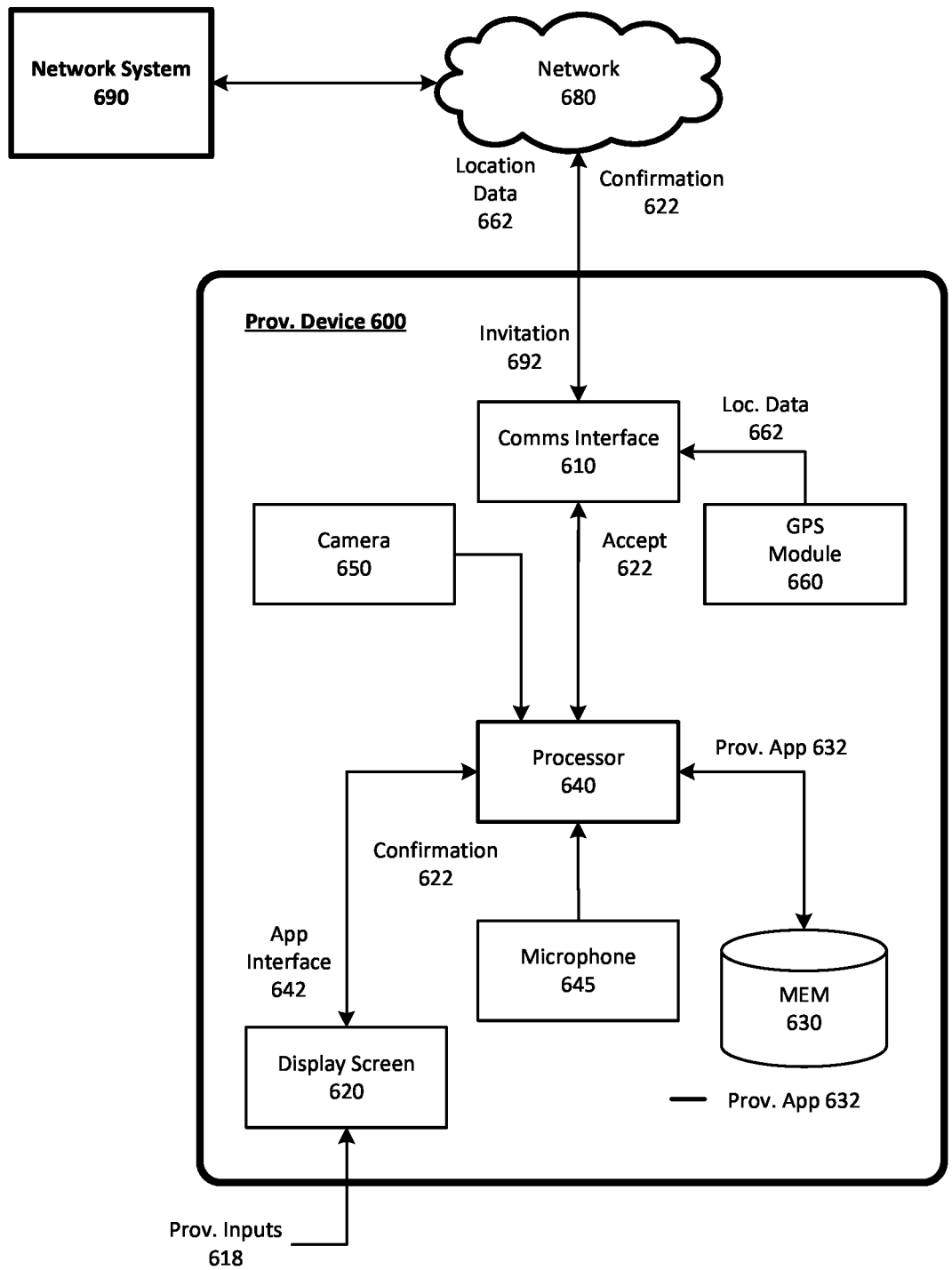
FIG. 6 is a block diagram illustrating an example provider device executing a designated service provider application for a network service, as described herein.

FIG. 6 is a block diagram illustrating an example provider device executing a designated service provider application for a network service, as described herein. In many implementations, the provider device 600 can comprise a mobile computing device, such as a smartphone, tablet computer, laptop computer, VR or AR headset device, and the like. As such, the provider device 600 can include typical telephony features such as a microphone 645, a camera 650, and a communication interface 610 to communicate with external entities using any number of wireless communication protocols. The provider device 600 can store a designated application (e.g., a service provider app 632) in a local memory 630. In response to a provider input 618, the service provider app 632 can be executed by a processor 640, which can cause an app interface 642 to be generated on a display screen 620 of the provider device 600. The app interface 642 can enable the service provider to, for example, accept or reject invitations 692 in order to service requests throughout a given region.

In various examples, the provider device 600 can include a GPS module 660, which can provide location data 662 indicating the current location of the service provider to the network system 690 over a network 680. Thus, the network system 690 can utilize the current location 662 of the service provider to determine whether the service provider is optimally located to service a particular service request. If the service provider is optimal to service the service request, the network system 690 can transmit an invitation 692 to the provider device 600 over the network 680. The invitation 692 can be displayed on the app interface 642, and can be accepted or declined by the service provider. If the service provider accepts the invitation 692, then the service provider can provide a user input 618 on the displayed app interface 642 to provide a confirmation 622 to the network system 690 indicating that the service provider will rendezvous with the requesting user at the start location to service the service request.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system for managing a network-based service, comprising:
   one or more processors; and
   one or more memory resources storing instructions that, when executed by the one or more processors of the network system, cause the network system to:

receive, over a network from a requesting user device of a requesting user, a set of multi-user request data corresponding to a multi-user request for service for a set of users that includes the requesting user and a first user, the set of multi-user request data indicating a common destination location for the set of users and identification information for at least the first user of the set of users;

in response to receiving the set of multi-user request data from the requesting user device, transmit a first set of data to a first user device of the first user to cause the first user device to prompt the first user to input, via the first user device, a start location for the first user; and identify a set of service providers to fulfill the multi-user request for service for the set of users, the set of service providers including a first service provider identified by the network system to provide service for the first user from the start location for the first user to the common destination location for the set of users.

2. The network system of claim 1, wherein the set of service providers is identified from a plurality of service providers based, at least in part, on an aggregate measure of respective estimated costs for the set of users for the multi-user request for service.

3. The network system of claim 1, wherein the set of service providers is identified from a plurality of service providers based, at least in part, on an aggregate measure of respective estimated times of arrival of the set of users at the common destination location.

4. The network system of claim 1, wherein the set of service providers is identified from a plurality of service providers based, at least in part, on optimizing the respective estimated times of arrival of the set users at the common destination location such that the estimated times of arrival fall within a time window.

5. The network system of claim 1, wherein the set of service providers is identified from a plurality of service providers based, at least in part, on an aggregate measure of respective estimated times of arrival of the set of service providers at respective start locations of the set of users.

6. The network system of claim 1, wherein the set of service providers is identified from a plurality of service providers based, at least in part, on performing multi-variate optimizations of at least two parameters, including: (i) an aggregate measure of respective estimated costs for the set of users for the multi-user request for service, and (ii) an aggregate measure of respective estimated times of arrival of the set of users at the common destination location.

7. The network system of claim 1, wherein the set of service providers identified to fulfill the multi-user request for service for the set of users comprises the first service provider associated with a first provider class and a second provider associated with a second provider class.

8. The network system of claim 1, wherein identifying the set of service providers to fulfill the multi-user request for service for the set of users includes identifying the first service provider to fulfill the multi-user request for service for the first user from the start location for the first user to the common destination location and at least a second user of the set of users from a start location for the second user to the common destination location.

9. The network system of claim 8, wherein the executed instructions further cause the network system to:

determine respective costs for the first user and the second user serviced by the first service provider based, at least in part, on respective distances associated with the first user and the second user.

10. The network system of claim 1, wherein the executed instructions further cause the network system to transmit, over the network to the first user device, a notification message that indicates a service progress with respect to the multi-user request for service for a second user of the set of users.

11. The network system of claim 1, wherein the executed instructions further cause the network system to:

monitor a service progress with respect to the multi-user request for service for a second user of the set of users to determine that the second user has arrived at the common destination location;

in response to determining that the second user has arrived at the common destination location, transmit a notification message to the first user device of the first user informing the first user that the second user has arrived at the common destination location.

12. The network system of claim 1, wherein the executed instructions further cause the network system to:

cause the requesting user device to display, within a user interface for submitting the multi-user request for service, a plurality of users of the network-based service for selection by the requesting user for inclusion in the set of users for the multi-user request for service.

13. The network system of claim 12, wherein the first user is identified by the network system for display on the requesting user device within the user interface for submitting the multi-user request for service based on a permission setting of the first user with respect to being included in the plurality of users for display within the user interface for submitting the multi-user request for service on the requesting user device of the requesting user.

14. The network system of claim 12, wherein the plurality of users is identified by the network system for display on the requesting user device within the user interface for submitting the multi-user request for service based on a contact list of the requesting user device.

15. The network system of claim 1, wherein the set of multi-user request data received from the requesting user device further indicates identification information for a second user of the set of users and a start location for the second user.

16. The network system of claim 1, wherein the executed instructions further cause the network system to:

transmit, to the first user device, identification information of the first service provider identified to fulfill the multi-user request for service for the first user; and transmit, to a second user device of a second user of the set of users, identification information of a second service provider identified to fulfill the multi-user request for service for the second user.

17. A computer-implemented method for managing an on-demand service, the method being performed by a network system and comprising:

receiving, over a network from a requesting user device of a requesting user, a set of multi-user request data corresponding to a multi-user request for service for a set of users that includes the requesting user and a first user, the set of multi-user request data indicating a common destination location for the set of users and identification information for at least the first user of the set of users;

in response to receiving the set of multi-user request data from the requesting user device, transmitting a first set of data to a first user device of the first user to cause the first user device to prompt the first user to input, via the first user device, a start location for the first user; and
identifying a set of service providers to fulfill the multi-user request for service for the set of users, the set of service providers including a first service provider identified by the network system to provide service for the first user from the start location for the first user to the common destination location for the set of users.

18. The computer-implemented method of claim 17, wherein the set of service providers is identified from a plurality of service providers based, at least in part, on performing multi-variate optimizations of at least two parameters, including: (i) an aggregate measure of respective estimated costs for the set of users for the multi-user request for service, and (ii) an aggregate measure of respective estimated times of arrival of the set of users at the common destination location.

19. A non-transitory computer-readable medium storing instructions that, when executed by one or more processors of a network system, cause the network system to:
receive, over a network from a requesting user device of a requesting user, a set of multi-user request data corresponding to a multi-user request for service for a set of users that includes the requesting user and a first user, the set of multi-user request data indicating a common destination location for the set of users and identification information for at least the first user of the set of users;
in response to receiving the set of multi-user request data from the requesting user device, transmit a first set of data to a first user device of the first user to cause the first user device to prompt the first user to input, via the first user device, a start location for the first user; and
identify a set of service providers to fulfill the multi-user request for service for the set of users, the set of service providers including a first service provider identified by the network system to provide service for the first user from the start location for the first user to the common destination location for the set of users.

20. The non-transitory computer-readable medium of claim 19, wherein the set of service providers is identified from a plurality of service providers based, at least in part, on performing multi-variate optimizations of at least two parameters, including: (i) an aggregate measure of respective estimated costs for the set of users for the multi-user request for service, and (ii) an aggregate measure of respective estimated times of arrival of the set of users at the common destination location.

* * * * *

UNITED STATES PATENT AND TRADEMARK OFFICE
CERTIFICATE OF CORRECTION

PATENT NO. : 11,622,018 B2
APPLICATION NO. : 17/476739
DATED : April 4, 2023
INVENTOR(S) : Matthew Sweeney et al.

It is certified that error appears in the above-identified patent and that said Letters Patent is hereby corrected as shown below:

In the Claims

At Column 19, Line 33 should read:
4. The network system of claim 3, wherein the set of service providers is identified from a plurality of service providers based, at least in part, on optimizing the respective estimated times of arrival of the set users at the common destination location such that the respective estimated times of arrival fall within a time window.

At Column 20, Line 12 should read:
11. The network system of claim 1, wherein the executed instructions further cause the network system to: monitor a service progress with respect to the multi-user request for service for a second user of the set of users to determine that the second user has arrived at the common destination location; and in response to determining that the second user has arrived at the common destination location, transmit a notification message to the first user device of the first user informing the first user that the second user has arrived at the common destination location.

Signed and Sealed this
Sixteenth Day of May, 2023

Katherine Kelly Vidal
*Director of the United States Patent and Trademark Office*